United States Patent
Kartoun et al.

(10) Patent No.: US 12,100,246 B2
(45) Date of Patent: Sep. 24, 2024

(54) METHOD FOR CONCEALING SENSITIVE MAIL RETURN ADDRESSES

(71) Applicant: International Business Machines Corporation, Armonk, NY (US)

(72) Inventors: Uri Kartoun, Cambridge, MA (US); Aris Gkoulalas-Divanis, Waltham, MA (US); Sophie Batchelder, Cambridge, MA (US); Krishnan Sugavanam, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 17/485,572

(22) Filed: Sep. 27, 2021

(65) Prior Publication Data
US 2023/0094317 A1     Mar. 30, 2023

(51) Int. Cl.
| | | |
|---|---|---|
| G07B 17/00 | (2006.01) | |
| B41M 3/14 | (2006.01) | |
| G06V 30/416 | (2022.01) | |
| G06V 30/19 | (2022.01) | |

(52) U.S. Cl.
CPC ......... G07B 17/00435 (2013.01); B41M 3/14 (2013.01); G06V 30/416 (2022.01); G07B 17/00508 (2013.01); G06V 30/1908 (2022.01); G07B 2017/00443 (2013.01); G07B 2017/00588 (2013.01)

(58) Field of Classification Search
None
See application file for complete search history.

(56) References Cited

U.S. PATENT DOCUMENTS

| | | | |
|---|---|---|---|
| 4,173,286 A | 11/1979 | Stanko | |
| 6,438,584 B1 | 8/2002 | Powers | |
| 7,693,942 B2 | 4/2010 | Nale | |
| 9,256,844 B2 | 2/2016 | Killian | |
| 2009/0144829 A1* | 6/2009 | Grigsby | ............. G06F 21/6263 726/26 |
| 2020/0117832 A1* | 4/2020 | Schmidt | ................ G06Q 50/01 |

OTHER PUBLICATIONS

"202 Elements on the Face of a Mailpiece", Postal Explorer, USPS, downloaded from the Internet on Aug. 12, 2021, Section 5.0, "Barcode Placement Letters and Flats", 16 pages, <https://pe.usps.com/text/dmm300/202.htm#ep1078238>.

(Continued)

*Primary Examiner* — Dov Popovici
(74) *Attorney, Agent, or Firm* — Pramod Chintalapoodi (57) ABSTRACT

A computer-implemented method for obfuscating sensitive information associated with mail delivery is disclosed. The computer-implemented method includes identifying that a piece of mail directed towards a potential recipient includes a particular type of sensitive information. The computer-implemented method further includes selecting a mail obfuscation policy for the particular type of sensitive information based on the particular type of sensitive information. The computer-implemented method further includes performing an obfuscation action with respect to the particular type of sensitive information based on the selected mail obfuscation policy.

17 Claims, 5 Drawing Sheets

(56) References Cited

OTHER PUBLICATIONS

"Envelope Patents and Patent Applications (Class 229/68.1)", JUSTIA, downloaded from the Internet Aug. 12, 2021, <https://patents.justia.com/patents-by-us-classification/229/68.1>, 23 pages.

Chaum, David, "Untraceable Electronic Mail, Return Addresses, and Digital Pseudonyms", Communications of the ACM vol. 24, No. 2, Feb. 1981, 8 pages.

Mell et al., "The NIST Definition of Cloud Computing", Recommendations of the National Institute of Standards and Technology, NIST Special Publication 800-145, Sep. 2011, 7 pages.

Naylor et al., "Balancing Accountability and Privacy in the Network." SIGCOMM'14, Aug. 17-22, 2014, Chicago, IL, USA, <http://dx.doi.org/10.1145/2619239.2626306>, 12 pages.

Shmatikov, Vitaly, "Buffer Overflow and Other Memory Corruption Attacks," CS 361S, Downloaded on Sep. 17, 2013, 85 pages.

* cited by examiner

METHOD FOR CONCEALING SENSITIVE MAIL RETURN ADDRESSES

BACKGROUND

The present invention relates generally to the field of mail delivery, and more particularly to obfuscating sensitive information during the mail delivery process.

When sending a letter or package in the mail, it is typical for a sender to include information that a recipient may deem to include sensitive information. For example, a recipient of a letter having a return address that is associated with a debt collection company may not want other individuals that come in contact with the letter to be privy to the recipients financial problems.

SUMMARY

According to one embodiment of the present invention, a computer-implemented method for obfuscating sensitive information associated with mail delivery is disclosed. The computer-implemented method includes identifying that a piece of mail directed towards a potential recipient includes a particular type of sensitive information. The computer-implemented method further includes selecting a mail obfuscation policy for the particular type of sensitive information based on the particular type of sensitive information. The computer-implemented method further includes performing an obfuscation action with respect to the particular type of sensitive information based on the selected mail obfuscation policy.

According to another embodiment of the present invention, a computer program product for obfuscating sensitive information associated with mail delivery. The computer program product includes one or more computer readable storage media and program instructions stored on the one or more computer readable storage media. The program instructions include instructions to identify that a piece of mail directed towards a potential recipient includes a particular type of sensitive information. The program instructions further include instructions to select a mail obfuscation policy for the particular type of sensitive information based on the particular type of sensitive information. The program instructions further include instructions to perform an obfuscation action with respect to the particular type of sensitive information based on the selected mail obfuscation policy.

According to another embodiment of the present invention, a computer system for obfuscating sensitive information associated with mail delivery. The computer system includes one or more computer processors, one or more computer readable storage media, and program instructions stored on the computer readable storage media for execution by at least one of the one or more computer processors. The program instructions include instructions to identify that a piece of mail directed towards a potential recipient includes a particular type of sensitive information. The program instructions further include instructions to select a mail obfuscation policy for the particular type of sensitive information based on the particular type of sensitive information. The program instructions further include instructions to perform an obfuscation action with respect to the particular type of sensitive information based on the selected mail obfuscation policy.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of mail delivery, and more particularly to obfuscating sensitive information during the mail delivery process.

Return addresses on the exterior of a letter or package as well as names and addresses of recipient individuals are visible to anyone who comes in close contact of the letter or package. Meaning, if a letter or package is intended for an individual, another individual (e.g., a neighbor) would be able to see where the letter or package was from. Knowing another individual is receiving a letter or package from certain return addresses can expose personal private information. This problem arises frequently where there are mail rooms such as in apartment or condominium complexes. In these settings, when a piece of mail or a package cannot fit in the recipient's mailbox, it is typically left out in the mailroom or lobby for anyone to see. Individuals receive mail or packages from entities, businesses, or organizations they do not want other people to know of. Certain return addresses and their associations thereof may be considered embarrassing or sensitive and thus, the recipient of mail having particular return addresses may not want other individuals to know information about the sender. Similarly, an individual may want to have a letter or package delivered to their residence without someone else they live with knowing the sender of the letter or package. For example, an individual is looking to surprise someone with a gift for a future birthday without the recipient of the gift being able to discern the contents of the gift prior to opening the gift.

There are instances where a return address for one individual may be considered embarrassing or sensitive but may not be considered embarrassing or sensitive to another individual. For example, if an individual works at law firm A, receiving a letter from law firm A may not be considered embarrassing or sensitive. Accordingly, this particular individual may not want the return address of law firm A concealed. On the other hand, another individual who is the defendant in a lawsuit initiated by law firm A may want the return address of law firm A concealed. Embodiments of the present invention recognize that different users will desire different return addresses from companies, entities, or organizations to be concealed. Embodiments of the present invention allow a user to customize what type or specific return addresses they would like to be concealed.

Embodiments of the present invention further recognize that a mail delivery service will still need to be able to determine the return address in the event they are unable to deliver the letter or package to the intended address. Embodiments of the present invention provide for concealing the real return address while still allowing the mail delivery service or intended recipient to determine the return address of the letter or package in the event that a piece of mail needs to be returned to the sender. Embodiments of the present invention further provide for the creation of a label containing a QR code, barcode, or any type of encrypted information that can be decoded to reveal a sender's return address. In an embodiment, only particular individuals or entities, such as the intended recipient of mail or mail delivery service is granted permission to access the information provided by the encrypted label. In one embodiment the encrypted label is printed on a sticker that could be placed on the envelope/package.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
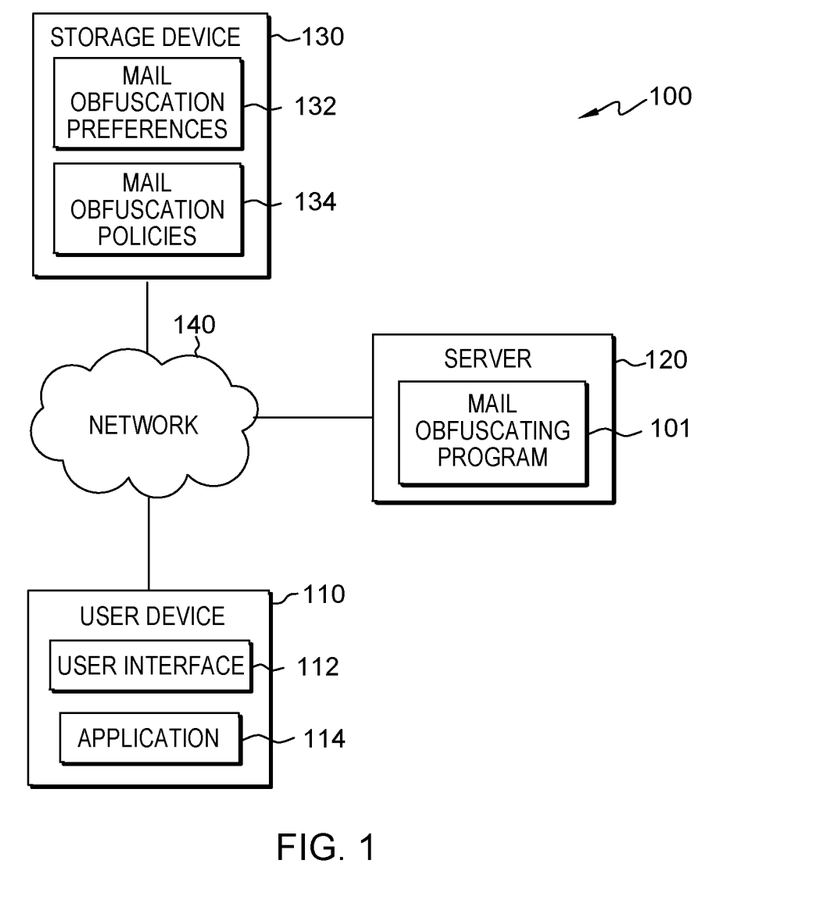
FIG. 1 is a block diagram of a network computing environment for generating an obfuscating mail label, generally designated 100, in accordance with at least one embodiment of the present invention.

The present invention will now be described in detail with reference to the Figures. FIG. 1 is a functional block diagram of a network computing environment for generating a obfuscating mail label, generally designated 100, in accordance with at least one embodiment of the present invention. In an embodiment, network computing environment 100 may be provided by cloud computing environment 50, as depicted and described with reference to FIG. 4, in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Network computing environment 100 includes user device 110, server 120, and storage device 130 interconnected over network 140. User device 110 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In general, user device 110 can represent any programmable electronic device or combination of programmable electronic devices capable of executing machine readable program instructions and communicating with server 120, storage device 130 and other devices (not depicted) via a network, such as network 140. User device 110 can include internal and external hardware components, as depicted and described in further detail with respect to FIG. 3.

User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on user device 110. In an embodiment, application 114 is representative of one or more applications (e.g., social media applications, web conferencing applications, and email applications) located on user device 110. In various example embodiments, application 114 can be an application that a user of user device 110 utilizes to generate an obfuscating mail label. In an embodiment, application 114 can be a client-side application associated with a server-side application running on server 130 (e.g., a client-side application associated with obfuscating program 101). In an embodiment, application 114 can operate to perform processing steps of mail obfuscating program 101 (i.e., application 114 can be representative of mail obfuscating program 101 operating on user device 110).

Server 120 is configured to provide resources to various computing devices, such as user device 110. In various embodiments, server 120 is a computing device that can be a standalone device, a management server, a web server, an application server, a mobile device, or any other electronic device or computing system capable of receiving, sending, and processing data. In an embodiment, server 120 represents a server computing system utilizing multiple computers as a server system, such as in a cloud computing environment. In an embodiment, server 120 represents a computing system utilizing clustered computers and components (e.g., database server computer, application server computer, web server computer, webmail server computer, media server computer, etc.) that act as a single pool of seamless resources when accessed within network computing environment 100. In general, server 120 represents any programmable electronic device or combination of programmable electronic devices capable of executing machine readable program instructions and communicating with each other, as well as with user device 110, storage device 130, and other computing devices (not shown) within network computing environment 100 via a network, such as network 140.

In an embodiment, server 120 includes mail obfuscating program 101. In an embodiment, mail obfuscating program 101 may be configured to access various data sources, such as mail obfuscation preferences 132 and mail obfuscation policies 134 that may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, mail obfuscating program 101 enables the authorized and secure processing of personal data. In an embodiment, mail obfuscating program 101 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, mail obfuscating program 101 provides information regarding personal data and the nature (e.g., type, scope, purpose, duration, etc.) of the processing. In an embodiment, mail obfuscating program 101 provides a user with copies of stored personal data. In an embodiment, mail obfuscating program 101 allows for the correction or completion of incorrect or incomplete personal data. In an embodiment, mail obfuscating program 101 allows for the immediate deletion of personal data.

Figure 3:
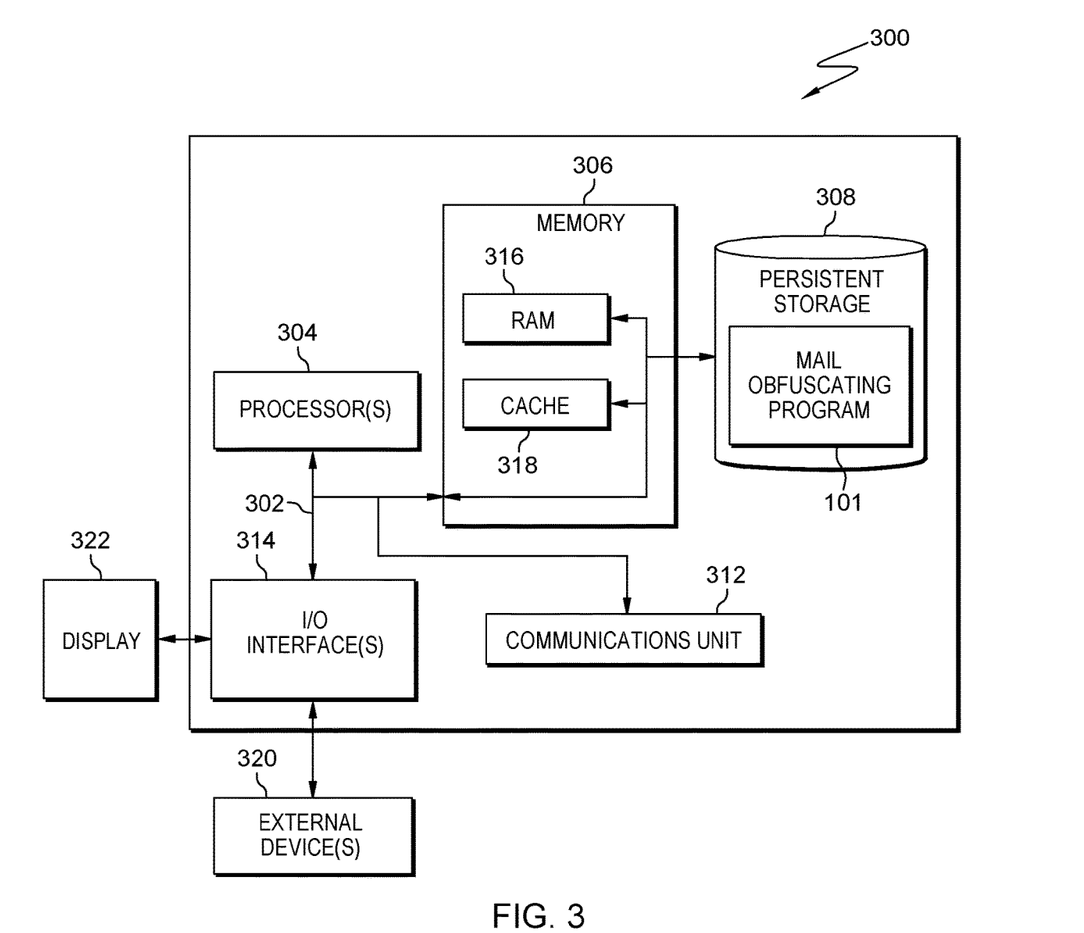
FIG. 3 is a block diagram depicting components of a computer, generally designated 300, suitable for executing a mail obfuscating program 101 in accordance with at least one embodiment of the present invention.
Figure 4:
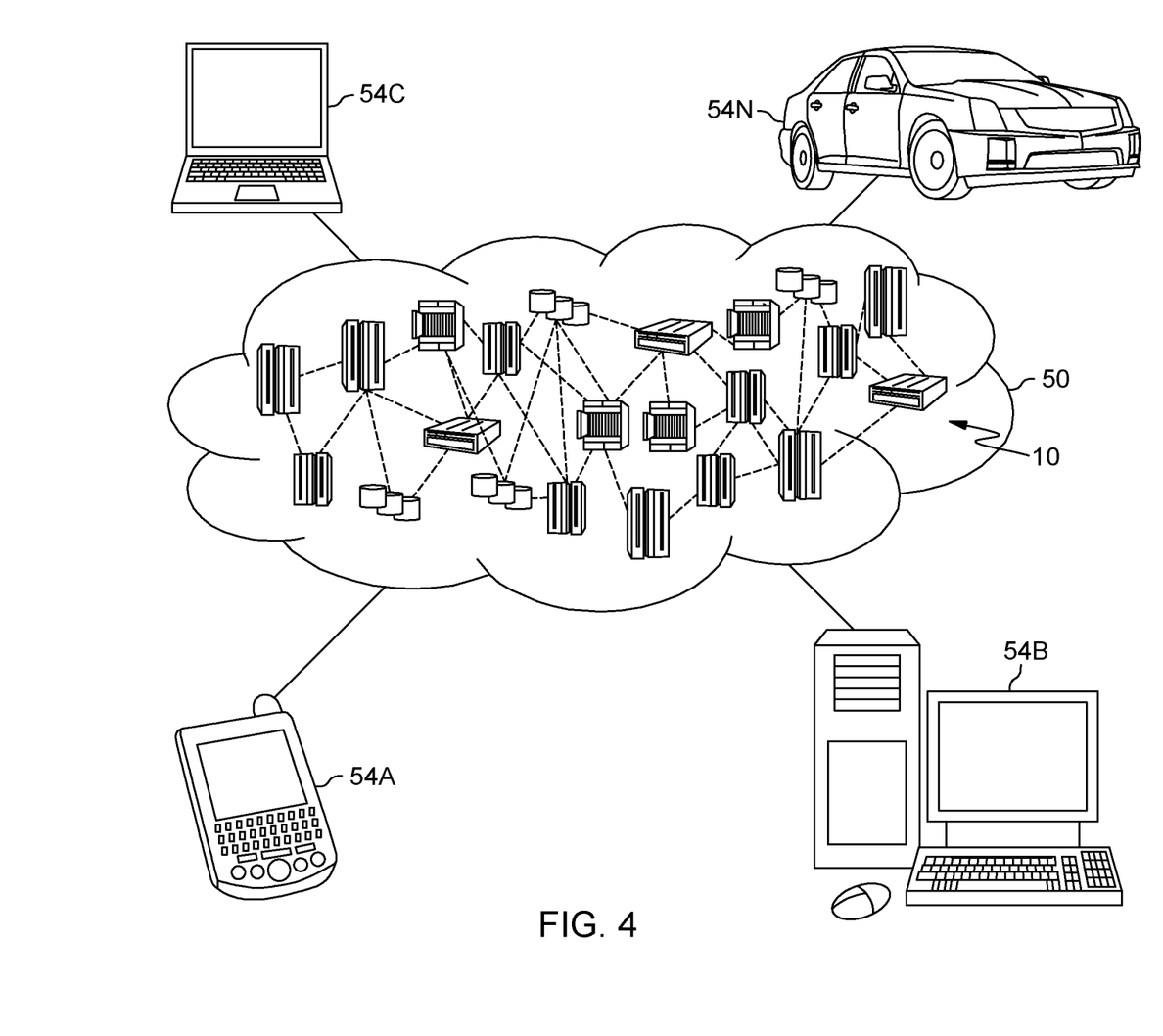
FIG. 4 is a block diagram depicting a cloud computing environment 50 in accordance with at least one embodiment of the present invention.

Server 120 may include components as depicted and described in detail with respect to cloud computing node 10, as described in reference to FIG. 4, in accordance with at least one embodiment of the present invention. Server 120 may include components, as depicted and described in detail with respect to computing device 300 of FIG. 3, in accordance with at least one embodiment of the present invention.

In various embodiments, storage device 130 is a secure data repository for generating an obfuscating mail label utilized by various applications and user devices of a user, such as user device 110. Storage device 130 may be implemented using any volatile or non-volatile storage media known in the art for storing data. For example, storage device 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 130 may be implemented with any suitable storage architecture known in the art, such as a relational database, an object-oriented database, or one or more tables.

In an embodiment, mail obfuscation preferences 132 includes the particular information or types of information associated with mail packaging that a user has indicated as including sensitive, confidential, or otherwise private subject matter. In an embodiment, mail obfuscation preferences 132 includes information on predetermined information that a mail recipient wants concealed or obfuscated. For example, types of information that a mail recipient wants concealed or obfuscated may include, but is not limited to, specific addresses or return addresses, specific words included in an address or return addresses, names of particular individuals, companies, or organizations, logos, and pictures. As a specific example, a user can designate that they want all return addresses which include the words "law", "hospital", or "debt" to be obfuscated. In another example, a user can designate that they want all return addresses from Law Firm A to be concealed. In an embodiment, mail obfuscating program 101 receives mail obfuscation preferences 132 of a particular user via user device 110 and stores this information in storage device 130.

In an embodiment, mail obfuscation preferences 132 further includes information associated with periods of validity for which respective types of sensitive information require obfuscation. In an embodiment, mail obfuscating program receives user input regarding a predetermined duration of time in which a mail recipient wants to conceal certain types of information (e.g., a particular address, organization, person, group, company, and keywords). As a specific example, mail obfuscating program 101 receives user input to conceal any mail with a return address containing the word "hospital" for 3 months. In this example, when mail obfuscating program 101 identifies any mail containing the word "hospital" in the return address over the next 3 months, mail obfuscating program 101 will generate an obfuscation label for the return address.

In an embodiment, mail obfuscation policies 134 includes information on policies for obfuscating mail. In an embodiment, mail obfuscation policies 134 include a dynamic set of rules for obfuscating one or more types of sensitive information associated with physical mail. In an embodiment, mail obfuscation policies 134 includes different decision-making actions mail obfuscating program 101 should perform based on determining that a particular type of information associated with the mail has been designated as sensitive by the mail recipient. For example, mail obfuscating program 101 detects that the exterior of a piece of mail contains the following keywords: "Main Street" and "debt collector." Mail obfuscating program 101 compares the detected words "Main Street" and "debt collector" to sensitive words either predetermined or received by user input as mail obfuscation preferences 132. Mail obfuscating program 101 determines "Main Street" does not match any predetermined or user input sensitive words and is not a sensitive word. Mail obfuscating program 101 further determines "debt collector" matches a sensitive word included in mail obfuscation preferences. Accordingly, mail obfuscating program 101 determines a mail obfuscation policy from mail obfuscation policies 134 for sensitive words including "debt collector" which requires obfuscating the words "debt collector."

In an embodiment, mail obfuscation policies 134 may include a different set of rules based on the particular type of information associated with the mail. A specific logo, for example, is linked to a specific organization—even if it does not explicitly hold textual information, some individuals may know what organization the logo represents. If a sensitive logo is detected (e.g., linked to a debt collector, to a hospital), mail obfuscation policies 134 may include a rule for generating a blank obfuscating label. In an embodiment, a blank obfuscation label is intended to be placed over any sensitive information detected. For example, if a sensitive logo is detected, if mail obfuscation policies 134 includes a rule to generate a blank obfuscation label for any detected sensitive logo, then mail obfuscation program generates a blank obfuscation label. However, if a return address of a company having a company name identified as sensitive is detected, mail obfuscation policies 134 may include a rule for generating a QR code label specific to the sensitive company and return address. In an embodiment, the generated QR code label covers the original return address or sender name. In an embodiment, the generated QR code label allows privileged users to scan the QR code to reveal the original return address or sender name. For example, a mail delivery worker is authorized to scan the QR code to determine the original return address or sender name. However, if the recipient of the mail's neighbor is not authorized to scan the QR code, then the original return address or sender name will not be decoded and displayed to the neighbor if the QR code is scanned by the neighbor. In one embodiment an individual may authorize another individual (e.g., a trusted neighbor, a friend, a family member) to scan the QR code (e.g., when the individual is on vacation).

In an embodiment, mail obfuscation policies 134 are generated based on user input. For example, mail obfuscating program 101 receives user input for one or more obfuscation actions to take based on the particular type of sensitive information detected. For example, sensitive addresses to conceal or obfuscate. For example, a user wants to conceal all mail with a return address from their employer, Employer A. In this example, mail obfuscating program 101 receives user input to conceal all mail return addresses from Employer A. In an embodiment, the sensitive address comprises a name, address, company, organization, group, logo, picture, location, or particular word. In an embodiment, mail obfuscating program 101 receives user input indicating a time period to conceal or obfuscate one or more sensitive addresses. In an embodiment, mail obfuscation policies 134 are generated based on historical obfuscation actions. In an embodiment, mail obfuscation policies 134 uses prior user input and learns which type of obfuscation policy and action to take with different types of sensitive information. For example, if mail obfuscating program 101 receives user input to obfuscate a logo from Hospital A, obfuscation program 101 selects a mail obfuscation policy to also obfuscate a detected logo from Hospital B.

In an embodiment, mail obfuscating program 101 identifies a first potential recipient of a piece of physical mail. In an embodiment, mail obfuscating program 101 utilizes natural language processing (NLP) to determine one or more words on the exterior of a piece of mail. For example, mail obfuscating program 101 determines a first potential recipient of a piece of physical mail with NLP. In an embodiment, mail obfuscating program 101 utilizes NLP to determine if a piece of mail contains a sensitive piece of information, such as a sensitive word or address. NLP is a subfield of linguistics, computer science, and artificial intelligence for processing natural language data and determining the meaning of a word, sentence, or segment of natural language data. In an embodiment, mail obfuscating program 101 determines that a piece of mail contains one or more sensitive pieces of information that require obfuscation. For example, mail obfuscating program 101 determines the exterior of a piece of mail contains the words "debt" "collector" and "payment past due."

In an embodiment, mail obfuscating program 101 scans or takes a picture of the piece of mail (such as a logo) and digitizes the image. In an embodiment, mail obfuscating program 101 scans mall with digital image processing techniques (e.g., edge detection). Edge detection identifies the points of an image or piece of mail which change sharply or has discontinuities. In an embodiment, mail obfuscating program 101 uses optical character recognition to determine the contents located on the exterior surface of a physical piece of mail. Optical character recognition is the electronic or mechanical conversion of images of typed, handwritten, or printed text into machine-encoded text, whether from a scanned document or piece of mail, a photo of a document or piece of mail, or image of a document or piece of mail.

In an embodiment, mail obfuscating program 101 determines logos or pictures on the exterior of a piece of mail. For example, mail obfuscating program 101 scans the exterior of a piece of mail to determine a visible well-known logo of a hospital on the exterior of a piece of mail.

In an embodiment, mail obfuscating program 101 compares one or more detected sensitive pieces of information on the exterior of the mail to one or more predetermined sensitive words to obfuscate included in mail obfuscation preferences 132 associated with a recipient of the mail. For example, mail obfuscating program 101 detects words "Boston" "Hospital" "123 Main Street", and a Boston Hospital logo. In this example, mail obfuscating program 101 compares words "Boston" "Hospital" "123 Main Street" and a Boston Hospital logo to one or more types of sensitive information included in mail obfuscation preferences 132 associated with the recipient of the mail and determines "Hospital" and the Boston Hospital logo are sensitive and required an obfuscation action.

In an embodiment, mail obfuscating program 101 identifies the location and size of the content to mask on the mail item. In an embodiment, mail obfuscating program 101 identifies the location and the size of the sensitive information on the piece of mail are located. For example, mail obfuscating program 101 determines the sensitive return address in the top left corner of the piece of mail is half an inch by one inch.

In an embodiment, mail obfuscating program 101 selects a particular mail obfuscating policy based, at least in part on, the particular type of sensitive information identified on the mail. In an embodiment, the particular selected mail obfuscating policy further includes the pseudonym or obfuscated information to replace the sensitive information detected identified on the mail. For example, if a return address from company A is identified as containing sensitive information, the mail obfuscating policy may include a rule to generate a barcode to replace the return address from company A. In another example, if a sensitive logo is detected, the selected mail obfuscation policy may include a rule for generating a blank obfuscating label. In yet another example, if a return address from a sensitive company is detected, the selected mail policy may include a rule for generating a QR code specific to the sensitive company and return address. Such that, every time a return address from "Unemployment Agency A" is detected, mail obfuscating program 101 generates a pseudonym return address of "Paper Company B." In an embodiment, the mail policy selected determines obfuscation instructions.

In an embodiment, mail obfuscating program 101 generates a pseudonym return address. For example, mail obfuscating program 101 generates a label with a pseudonym return address of "XXXXX" to obfuscate the real return address from a sensitive sender. In another embodiment the return address specified is generic (e.g., Boston Mail Distribution Center, Harbor St., Boston, MA).

In an embodiment, mail obfuscating program 101 generates a QR code, barcode, or alphabetical and or numerical code. In an embodiment, the generated code is to be placed over the sensitive information. For example, mail obfuscating program 101 generates a QR code label to be placed over the sensitive return address. In an embodiment, the generated QR code is scanned by the recipient or mail delivery facility and the authentic return address is revealed, typically on user device 110. In an embodiment, a user who scans or uses the code needs permission in order to determine the real return address. For example, a delivery worker can scan the QR code and has enough permission to determine the real return address. In an embodiment, the real return address or return recipient is displayed on user device 110. However, in this example, a neighbor of the recipient address does not have enough permission to reveal the real return address if they scan the same QR code.

In an embodiment, mail obfuscating program 101 generates a blank obfuscation label to be placed over the sensitive information. For example, mail obfuscating program 101 generates a blank obfuscation label to be placed over a sensitive logo or picture on a piece of mail. In an embodiment, mail obfuscating program 101 labels a particular piece of information on a piece of physical mail according to one or more obfuscation instructions.

In an embodiment, a method of obfuscating a sender address included on a piece of physical mail includes receiving obfuscation instructions from a first potential recipient of the piece of physical mail from a first sender.

In an embodiment, the method of obfuscating the sender address included on the piece of physical mail further includes, responsive to determining that the first potential recipient will receive the first piece of physical mail from the first sender, labelling the first sender address according to the obfuscation instructions.

In an embodiment, the method of obfuscating the sender address included on the piece of physical mail further includes sending the first piece of physical mail with the sender address obfuscated according to the obfuscation instructions.

In an embodiment, the method of obfuscating the sender address included on the piece of physical mail further includes applying the obfuscation instruction to a class of senders. In an embodiment, the obfuscation instructions are only valid for a predetermined period of time. In an embodiment, the obfuscation instructions include instructions to generated a personalized bar code to replace the first sender address.

Although embodiments of the present invention are directed towards identing and obfuscating sensitive information associated with physical mail, embodiments of the invention may also be practiced using electronic mail or e-mail. For example, mail obfuscating program 101 may detect one or more types of sensitive information included in an e-mail header, such as the, "From", "To", "Date", and "Subject" lines, or message body and generate one or more obfuscation action associated with the detected types of sensitive information. As a specific example, mail obfuscating program 101 identifies a sensitive email address included in the "From" line of the header of an electronic mail and replaces the email address with an encrypted email address that can only be decrypted by the recipient of the email.

Figure 2:
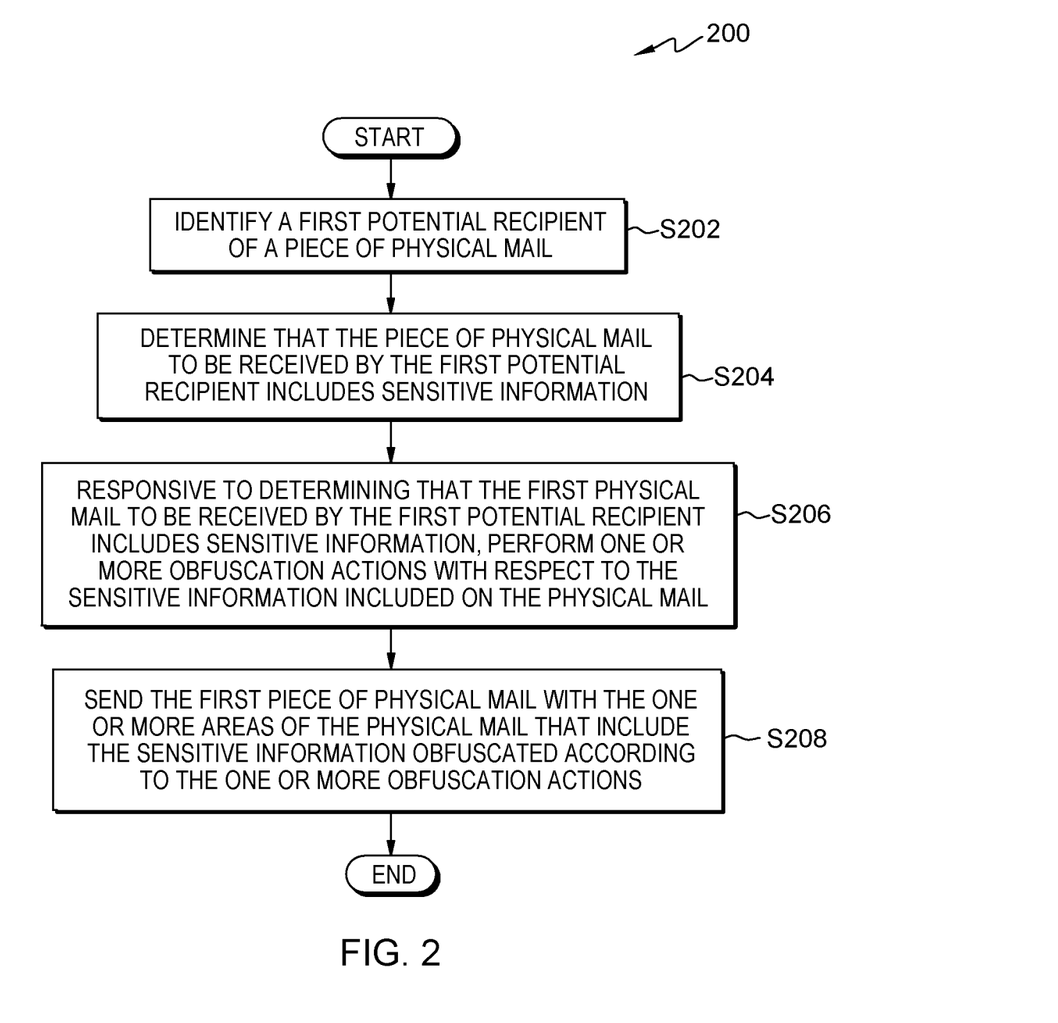
FIG. 2 is a flow chart diagram depicting operational steps for generating an obfuscating mail label, generally designated 200, in accordance with at least one embodiment of the present invention.

FIG. 2 is a flow chart diagram depicting operational steps for generating an obfuscating mail label, generally designated 200, in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, mail obfuscating program 101 identifies a first potential recipient of a piece of physical mail. In an embodiment, mail obfuscating program 101 utilizes natural language processing (NLP) to determine one or more words on the exterior of a piece of mail.

At step S204, mail obfuscating program 101 determines that the piece of physical mail to be received by the first potential recipient includes sensitive information. In an embodiment, mail obfuscating program 101 determines that the piece of physical mail includes sensitive information based on comparing the content visible on the mail packaging to one or more types of information indicated in first potential recipient's mail obfuscation preferences 132. For example, mail obfuscating program 101 compares detected words on the mail packaging to predetermined sensitive words included in mail obfuscation preferences 132.

At step S206, responsive to determining that the piece of physical mail to be received by the first potential recipient includes sensitive information, mail obfuscating program 101 performs one or more obfuscation actions with respect to the sensitive information included on the physical mail. In an embodiment, the particular obfuscation action performed with respect to the sensitive information is based on the type of sensitive information identified. For example, mail obfuscating program 101 generates a label, such as a QR code, barcode, or alphabetical and/or numerical code to obfuscate the sensitive information.

In an alternative embodiment, responsive to determining that the piece of physical mail to be received by the first potential recipient includes sensitive information, mail obfuscating program 101 performs one or more obfuscation actions to obfuscate the sensitive information. In an embodiment, in lieu of including the sensitive information on the piece of physical mail, mail obfuscating program 101 labels the information identified as being sensitive according to one or more obfuscation actions. For example, if a sender address is identified as including sensitive information according to mail obfuscation preferences 132 associated with the first potential recipient of the piece of physical mail, mail obfuscating program 101 may label the sender address as a QR code based on a corresponding mail obfuscating policy.

At step S208, mail obfuscating program 101 sends the first piece of physical mail with the one or more areas of the physical mail that include the sensitive information obfuscated according to the one or more obfuscation actions.

FIG. 3 is a block diagram depicting components of a computing device, generally designated 300, suitable for mail obfuscating program 101 in accordance with at least one embodiment of the invention. Computing device 300 includes one or more processor(s) 304 (including one or more computer processors), communications fabric 302, memory 306 including, RAM 316 and cache 318, persistent storage 308, which further includes mail obfuscating program 101, communications unit 312, I/O interface(s) 314, display 322, and external device(s) 320. It should be appreciated that FIG. 3 provides only an illustration of one embodiment and does not imply any limitations with regard to the environments in which different embodiments may be implemented. Many modifications to the depicted environment may be made.

As depicted, computing device 300 operates over communications fabric 302, which provides communications between computer processor(s) 304, memory 306, persistent storage 308, communications unit 312, and input/output (I/O) interface(s) 314. Communications fabric 302 can be implemented with any architecture suitable for passing data or control information between processor(s) 304 (e.g., microprocessors, communications processors, and network processors), memory 306, external device(s) 320, and any other hardware components within a system. For example, communications fabric 302 can be implemented with one or more buses.

Memory 306 and persistent storage 308 are computer readable storage media. In the depicted embodiment, memory 306 includes random-access memory (RAM) 316 and cache 318. In general, memory 306 can include any suitable volatile or non-volatile one or more computer readable storage media.

Program instructions for mail obfuscating program 101 can be stored in persistent storage 308, or more generally, any computer readable storage media, for execution by one or more of the respective computer processor(s) 304 via one or more memories of memory 306. Persistent storage 308 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 312 can include one or more network interface cards. Communications unit 312 may provide communications through the use of either or both physical and wireless communications links. In the context of some embodiments of the present invention, the source of the various input data may be physically remote to computing device 300 such that the input data may be received, and the output similarly transmitted via communications unit 312.

I/O interface(s) 314 allows for input and output of data with other devices that may operate in conjunction with computing device 300. For example, I/O interface(s) 314 may provide a connection to external device(s) 320, which may be as a keyboard, keypad, a touch screen, or other suitable input devices. External device(s) 320 can also include portable computer readable storage media, for example thumb drives, portable optical or magnetic disks, and memory cards. Software and data used to practice embodiments of the present invention can be stored on such portable computer readable storage media and may be loaded onto persistent storage 308 via I/O interface(s) 314. I/O interface(s) 314 also can similarly connect to display 322. Display 322 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 4 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
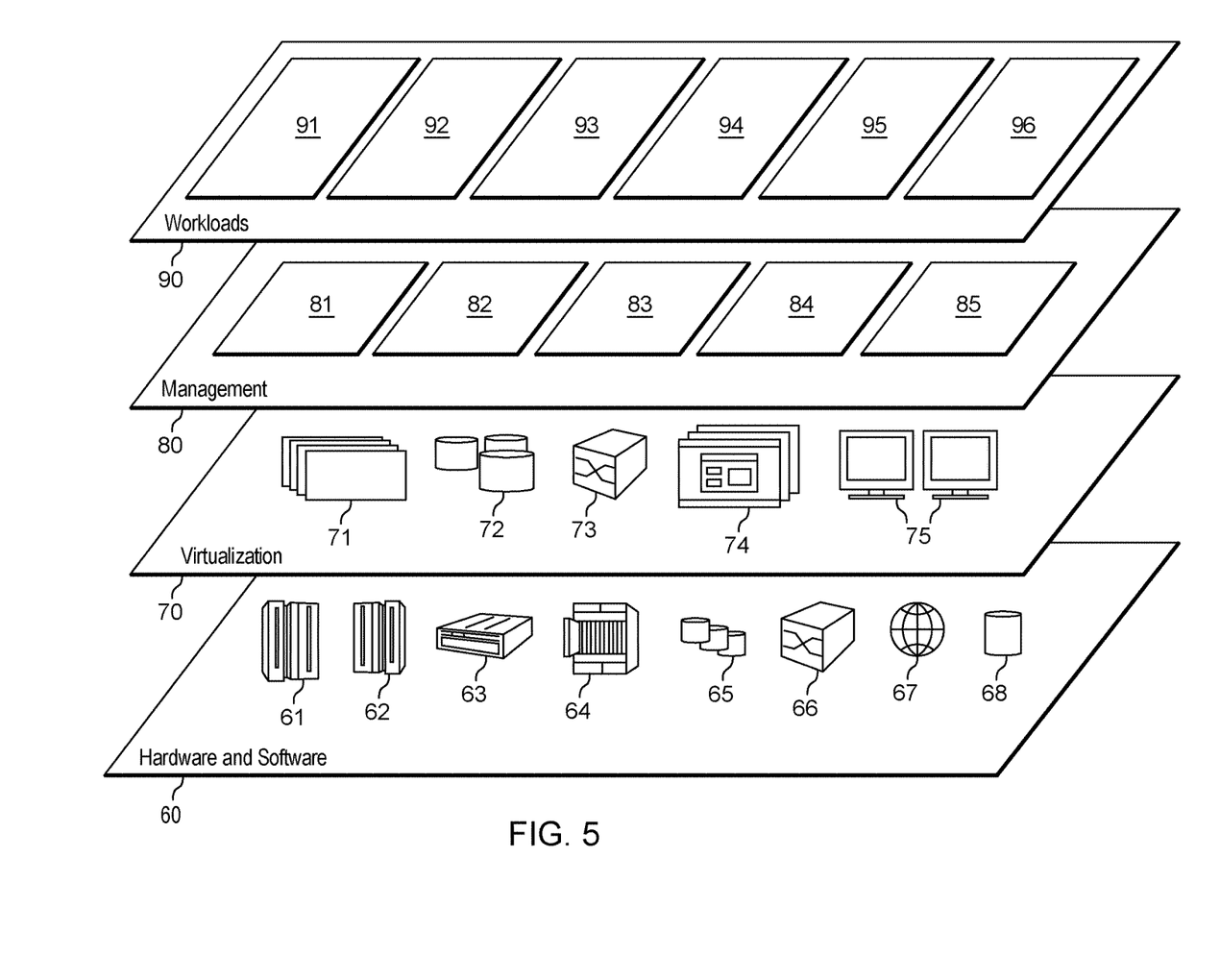
FIG. 5 is block diagram depicting a set of functional abstraction model layers provided by cloud computing environment 50 depicted in FIG. 4 in accordance with at least one embodiment of the present invention.

FIG. 5 is block diagram depicting a set of functional abstraction model layers provided by cloud computing environment 50 depicted in FIG. 4 in accordance with at least one embodiment of the present invention. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mail obfuscation 96.

What is claimed is:

1. A computer-implemented method for obfuscating sensitive information associated with mail delivery, the computer-implemented method comprising:
   identifying that a piece of mail directed towards a potential recipient includes a particular type of sensitive information, wherein the identifying that the piece of mail directed towards the potential recipient includes the particular type of sensitive information is based, at least in part, on comparing one or more detected words on the piece of mail to received user input of sensitive words to be obfuscated;
   selecting a mail obfuscation policy for the particular type of sensitive information based on the particular type of sensitive information; and
   performing an obfuscation action with respect to the particular type of sensitive information based on the selected mail obfuscation policy.

2. The computer-implemented method of claim 1, wherein the obfuscation action includes labeling the piece of mail with at least one of a QR code or a barcode in place of the particular type of sensitive information.

3. The computer-implemented method of claim 1, wherein the particular type of sensitive information includes an associated period of validity during which the obfuscation action is performed on the particular type of sensitive information.

4. The computer-implemented method of claim 2, wherein the at least one of the QR code or the barcode includes information corresponding to the particular type of sensitive information, and further wherein one or more predetermined users are granted permission to access the particular type of sensitive information via the at least one of the QR code or the barcode.

5. The computer-implemented method of claim 1, wherein the piece of mail is at least one of a physical piece of mail or an electronic piece of mail.

6. The computer-implemented method of claim 1, wherein the obfuscation action includes labeling the piece of mail with a pseudonym return address.

7. A computer program product for obfuscating sensitive information associated with mail delivery, the computer program product comprising one or more computer readable storage media and program instructions stored on the one or more computer readable storage media, the program instructions including instructions to:
   identify that a piece of mail directed towards a potential recipient includes a particular type of sensitive information, wherein the identifying that the piece of mail directed towards the potential recipient includes the particular type of sensitive information is based, at least in part, on comparing one or more detected words on the piece of mail to received user input of sensitive words to be obfuscated;

select a mail obfuscation policy for the particular type of sensitive information based on the particular type of sensitive information; and perform an obfuscation action with respect to the particular type of sensitive information based on the selected mail obfuscation policy.

8. The computer program product of claim 7, wherein the obfuscation action includes labeling the piece of mail with at least one of a QR code or a barcode in place of the particular type of sensitive information.

9. The computer program product of claim 7, wherein the particular type of sensitive information includes an associated period of validity during which the obfuscation action is performed on the particular type of sensitive information.

10. The computer program product of claim 8, wherein the at least one of the QR code or the barcode includes information corresponding to the particular type of sensitive information, and further wherein one or more predetermined users are granted permission to access the particular type of sensitive information via the at least one of the QR code or the barcode.

11. The computer program product of claim 7, wherein the piece of mail is at least one of a physical piece of mail or an electronic piece of mail.

12. The computer program product of claim 7, wherein the obfuscation action includes labeling the piece of mail with a pseudonym return address.

13. A computer system for obfuscating sensitive information associated with mail delivery, comprising:
- one or more computer processors;
- one or more computer readable storage media; and
- computer program instructions;

the computer program instructions being stored on the one or more computer readable storage media for execution by the one or more computer processors; and the computer program instructions including instructions to:
- identify that a piece of mail directed towards a potential recipient includes a particular type of sensitive information, wherein the identifying that the piece of mail directed towards the potential recipient includes the particular type of sensitive information is based, at least in part, on comparing one or more detected words on the piece of mail to received user input of sensitive words to be obfuscated;
- select a mail obfuscation policy for the particular type of sensitive information based on the particular type of sensitive information; and
- perform an obfuscation action with respect to the particular type of sensitive information based on the selected mail obfuscation policy.

14. The computer system of claim 13, wherein the obfuscation action includes labeling the piece of mail with at least one of a QR code or a barcode in place of the particular type of sensitive information.

15. The computer system of claim 13, wherein the particular type of sensitive information includes an associated period of validity during which the obfuscation action is performed on the particular type of sensitive information.

16. The computer system of claim 14, wherein the at least one of the QR code or the barcode includes information corresponding to the particular type of sensitive information, and further wherein one or more predetermined users are granted permission to access the particular type of sensitive information via the at least one of the QR code or the barcode.

17. The computer system of claim 13, wherein the piece of mail is at least one of a physical piece of mail or an electronic piece of mail.

* * * * *